June 23, 1970  A. J. ROERIG ET AL  3,516,714

CHIP FEEDER VALVE

Filed March 23, 1966  7 Sheets-Sheet 1

INVENTORS
ARNOLD J. ROERIG
KENTON J. BROWN

BY  ATTORNEYS

Fig-8

United States Patent Office 3,516,714
Patented June 23, 1970

3,516,714
CHIP FEEDER VALVE
Arnold J. Roerig, Beloit, Wis., and Kenton J. Brown, Rockford, Ill., assignors to Beloit Corporation, Beloit, Wis., a corporation of Wisconsin
Filed Mar. 23, 1966, Ser. No. 536,706
Int. Cl. B65g 53/40
U.S. Cl. 302—14                                    2 Claims

ABSTRACT OF THE DISCLOSURE

A valve for continuously metering and feeding a supply of wood chips in a continuous pulping or digesting process.

---

This invention relates generally to pulp and papermaking apparatus and more particularly to apparatus for metering and feeding wood chips during a continuous pulping or digesting process.

Advances have been made in the development of continuous pulping processes and there are now a number of soundly developed systems for continuous pulping, particularly of the chemical and semi-chemical types. Continuous pulping can afford many advantages over a batch operation, among which are reduced time requirements, a more uniform product, utilization of better control methods, and greater flexibility.

Continuous pulping processes are often complicated, however, and have presented problems of mechanical design. First of all, means are provided for metering the chips into the system at a predetermined rate. Then the chips are generally transferred to one or more tanks for initial treatment where they are subjected to liquor at one or more temperature/pressure levels, to steam, etc., depending on the particular process involved. The initially treated chips are then transferred from the tanks to the digester itself.

It will be appreciated that many difficulties are encountered in attempting to maintain a continuous flow of uniformly treated chips through the initial treatment phase and into the digester. There is, first of all, the problem of physically transferring the chips from one tank to another, particularly since in many instances the temperatures and especially the pressures of the liquors in the various vessels are substantially different, thus necessitating complete isolation of the tanks. Then, since the volumes of the tanks are generally quite large, some chips are apt to receive more treatment than others due to the temperature differentials within the tanks themselves, or because some chips are more directly subjected to steam than others.

The present invention resolves many of these problems. In accordance with the principles of the invention the initial treatment of the chips is carried on within a continuously operating chip feeder valve which also provides for metering of the chips into the system. The chips are treated in small quantities, thus ensuring uniformity of treatment, and provision is made for subjecting the chips to a variety of treatments within a single valve.

Thus many of the various pressure vessels and interconnecting piping and pumps therebetween are eliminated, as well as separate metering means. The quality and productivity of the system is increased while at the same time the overall cost is reduced.

It is, therefore, an object of the present invention to provide an improved continuous pulping or digester system.

Another object of the invention is to improve the uniformity of treatment of the chips in the initial stages of the system.

Another object of the invention is to reduce the initial and operating costs of a digester system while increasing the quality and productivity thereof.

Still another object of the invention is to provide a chip feeder valve which not only meters the chips into the system but embodies within itself various treatment zones for the chips.

Yet another object of the invention is to provide a chip feeder valve comprising a rotor carried for rotation within a housing for receiving chips at one circumferential point or station, for subjecting the chips to treatment at other stations and for discharging the chips at still another station.

Another object of the invention is to provide the chip feeder valve rotor with bearing members situated so as to minimize deflection of the rotor.

Still another object of the invention is to provide means for deaerating the chips before they are delivered to the digester itself.

Another object of the invention resides in the provision of improved means for feeding and metering the dry chips into a continuous digester process.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

Figure 1:
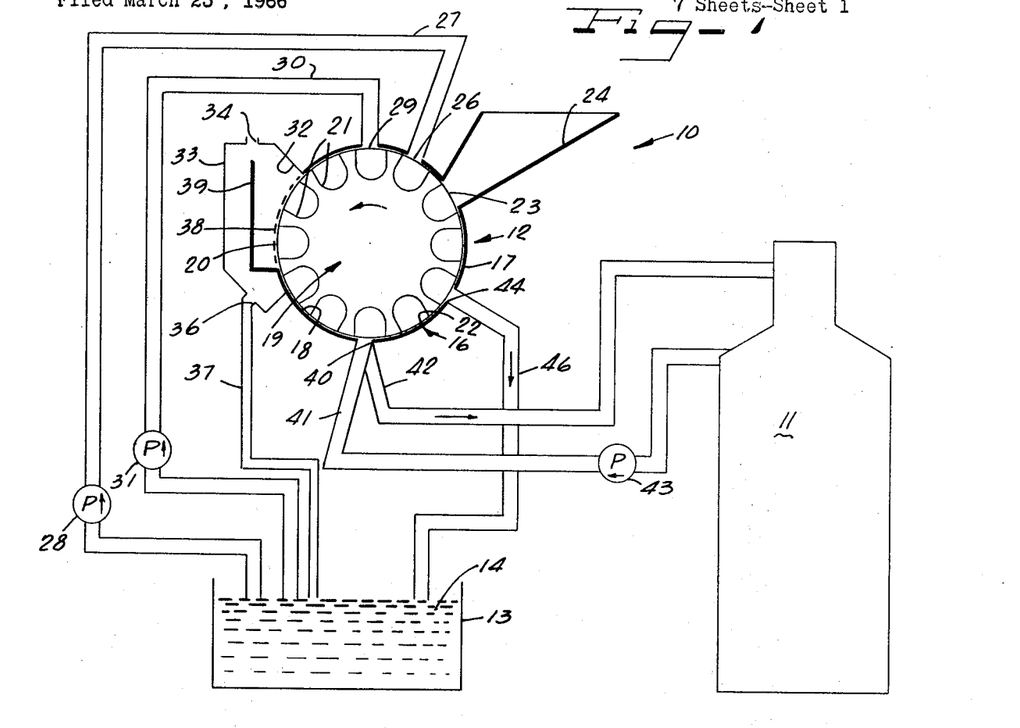
FIG. 1 is a schematic plumbing diagram of a continuous pulping or digester system constructed in accordance with the principles of the present invention.

As shown in the schematic diagram of FIG. 1, an exemplary continuous pulping or digester system, which is indicated generally at reference numeral 10 and which is constructed in accordance with the principles of this invention, comprises a digester 11 and a chip feeder valve, indicated generally at 12. Also included is a reservoir or tank 13 containing a quantity of liquor 14 which is circulated through the system 10 by means of various piping arrangements for treating the chips in early stages of the digesting process.

The chip feeder valve 12 receives dry chips from a chip delivery system and meters the chip into the continuous digesting system. In addition the valve 12 serves as a plurality of vessels for containing multiple quantities of chips as the chips are subjected to various treatments in the preliminary stages of the digesting system before the chips are transferred to the digester itself.

In the illustrated embodiment the chip feeder valve 12 comprises a valve housing 16 having a wall 17 which forms a substantially cylindrical bore 18 within the housing 16. A rotatable member 19, which may be defined as a rotor, includes an outer peripheral wall 20 shaped complementarily to the bore 18 of the housing 16 and is carried within the bore 18 for rotation in the direction of the arrow.

The rotor 19 has a number of individual compartments or pockets 21 formed therein and spaced circumferentially therearound. Each of the pockets 21 has an open end 22 which opens to the cylindrical peripheral wall 20 of the rotor 19.

The pockets 21 serve as small individual containers for metering quantities of chips into the digester system 10 and for carrying the chips through various preliminary treatment zones in the system.

Thus, in the embodiment shown in FIG. 1, an opening 23 is formed in the housing wall 17 for communicating the interior of a chip bin 24 with the bore 18 and, of course, the interior of the pockets 21 as the pockets are rotated thereacross. Green (previously untreated) chips are supplied continuously by suitable means such as an automatic conveyor to the chip bin 24 and as each of the pockets 21 rotates across the opening 23 it is filled with a quantity of chips. The rate at which the chips are fed into the digester system 10 is thus a function of the speed of the rotor 19, the size of the pockets 21 and the circumferential spacing therebetween.

As each pocket 21 is filled with chips and rotates in a counterclockwise direction from the opening 23 it next registers with an opening 26 to which is connected a suitable conduit 27 having a pump 28 mounted therein for delivering liquor to the chips carried in the pockets.

In the digesting system shown the liquor delivered to the chips in conduit 27 is at a relatively low pressure for providing the chips with an initial treatment. In other digesting systems, of course, the chips may be initially subjected to another treatment such as live steam. It will be appreciated that the principles involved herein are equally applicable regardless of the number and type of treatments to which the chips are subjected before they are transferred to the digester 11.

Another opening 29 is formed in the valve housing 17 in circumferential spaced relation to opening 26 in the direction of rotation of the rotor 19. A conduit 30 is connected to the opening 29 and has mounted therein a pump 31 for subjecting the chips carried in the pockets 21 to another treatment which, in the exemplary system shown, involves liquor at a relatively high pressure.

It has been determined that if a mixture of liquor and chips is subjected first to a relatively high pressure and then to a relatively low pressure, the chips themselves will be deaerated. Deaeration is desirable because it accelerates liquor impregnation into the chips and because it reduces the problem of pumping liquor and chips to the digester.

In order to provide for deaeration another opening 32 is formed in the valve housing wall 17 and is surrounded by an enclosure 33 which has formed therein at the top thereof a vent opening 34 and at the bottom thereof a drain opening 36. Opening 34 is vented to atmosphere and opening 36 is connected by means of a conduit 37 to the liquor reservoir 13.

As the pockets 21 rotate in a counterclockwise direction from the opening 29 they are filled with high pressure liquor and chips. As soon as these pockets rotate across opening 32, however, the pressure of the liquor is reduced with attendant deaeration of the chips. In order to retain the chips within the pockets a screen 38 (illustrated in dashed lines) is mounted on the housing across the opening 32, and in order to retain the liquor within the pockets a baffle 39 is disposed within the enclosure 33 to maintain a level of liquor between the baffle and the rotor as high as the opening 32. Excessive liquor rises over the top of the baffle to drain back to the reservoir 13.

As the pockets 21 continue counterclockwise rotation from the opening 32 they are next rotated across another opening 40 formed in the housing wall 17 of the chip feeder valve 12. The opening 40 is axially elongated and communicates at its opposite ends with a pair of conduits 41 and 42 which are, in turn, connected in fluid communication to the digester 11. A high pressure liquor pump 43 is mounted in the conduit 41 for delivering a stream of high pressure liquor into the pockets 21 as they rotate across opening 40 whereby the chips are flushed from the pockets and transferred, along with the high pressure liquor, into the digester 11. A drain opening 44 is formed in the lower ascending quadrant of the housing wall 17 for draining the liquor which is retained in the pockets 21 back to the reservoir 13 through a conduit 46. A screen 25 is mounted on the housing wall 17 across an opening 25a formed in the housing wall to prevent chips which undesirably may remain in the pockets 21 from draining through the drain opening 44.

Note that the high pressure conduit 41 opens to the rotor at a location which is diametrically opposite the opening of conduit 30. Thus situated, the high pressures to which the rotor is subjected are counterbalanced to prevent excessive deflection of the rotor and undue wear on the rotor bearings.

As previously noted, additional treatment stations can be formed in the housing wall 17 for providing additional treatments to the chips as they are carried by the rotor 19 from the chip inlet 23 around to the chip flushing opening 40. Further, the number of pockets 21 formed in the rotor can be increased or decreased, the physical size of the components can be varied and the valve 12 can be utilized in conjunction with other chip feeder valves in order to increase the rate of flow of preliminarily treated chips into the digester 11.

Figures 2, 9:
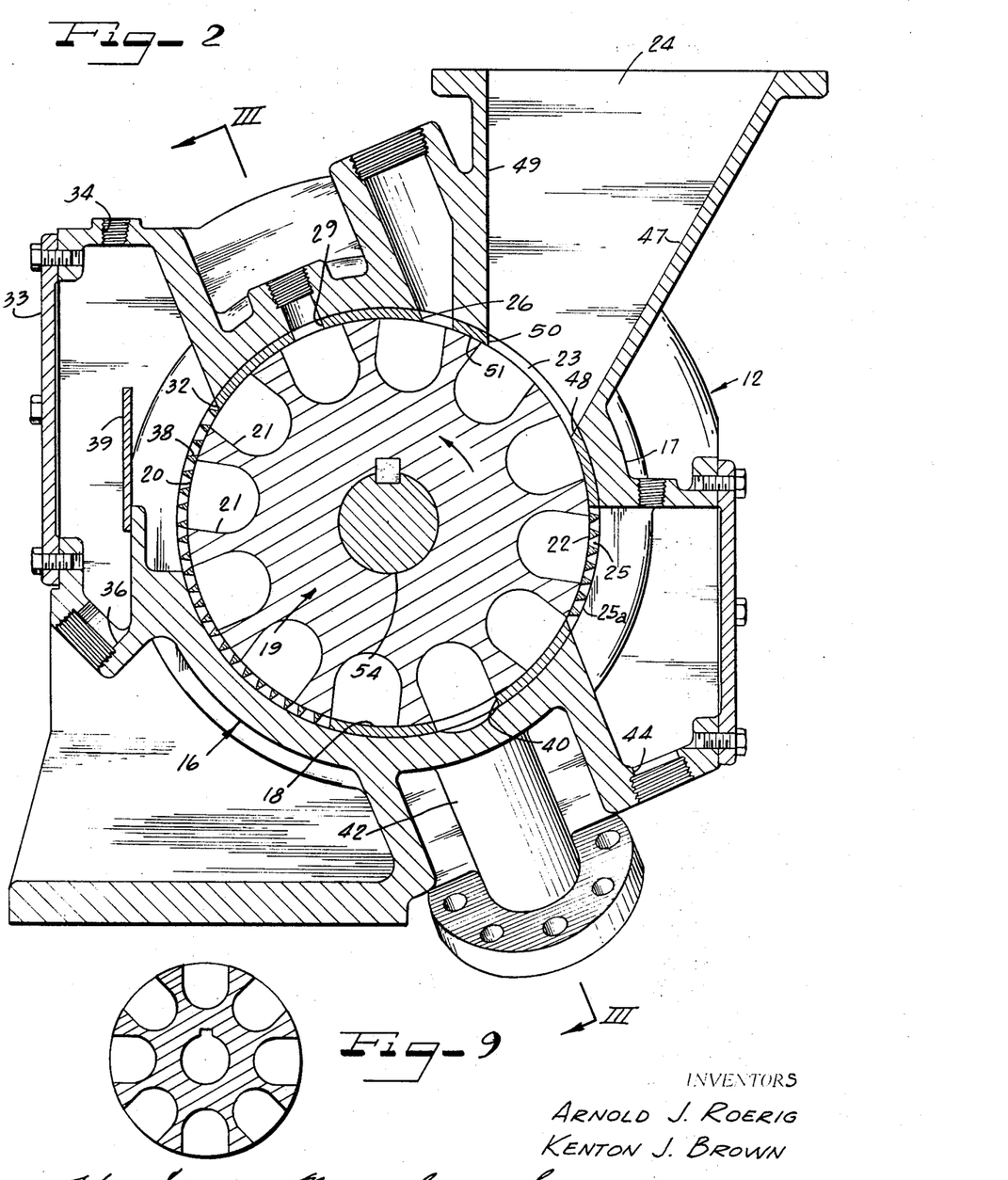
FIG. 2 is a vertical cross-sectional view of one embodiment of a chip feeder valve constructed according to the principles of this invention.
FIG. 9 is a vertical cross-sectional view of an embodiment of a rotor member which can be utilized with the chip feeder valves shown in the other figures.
Figure 3:
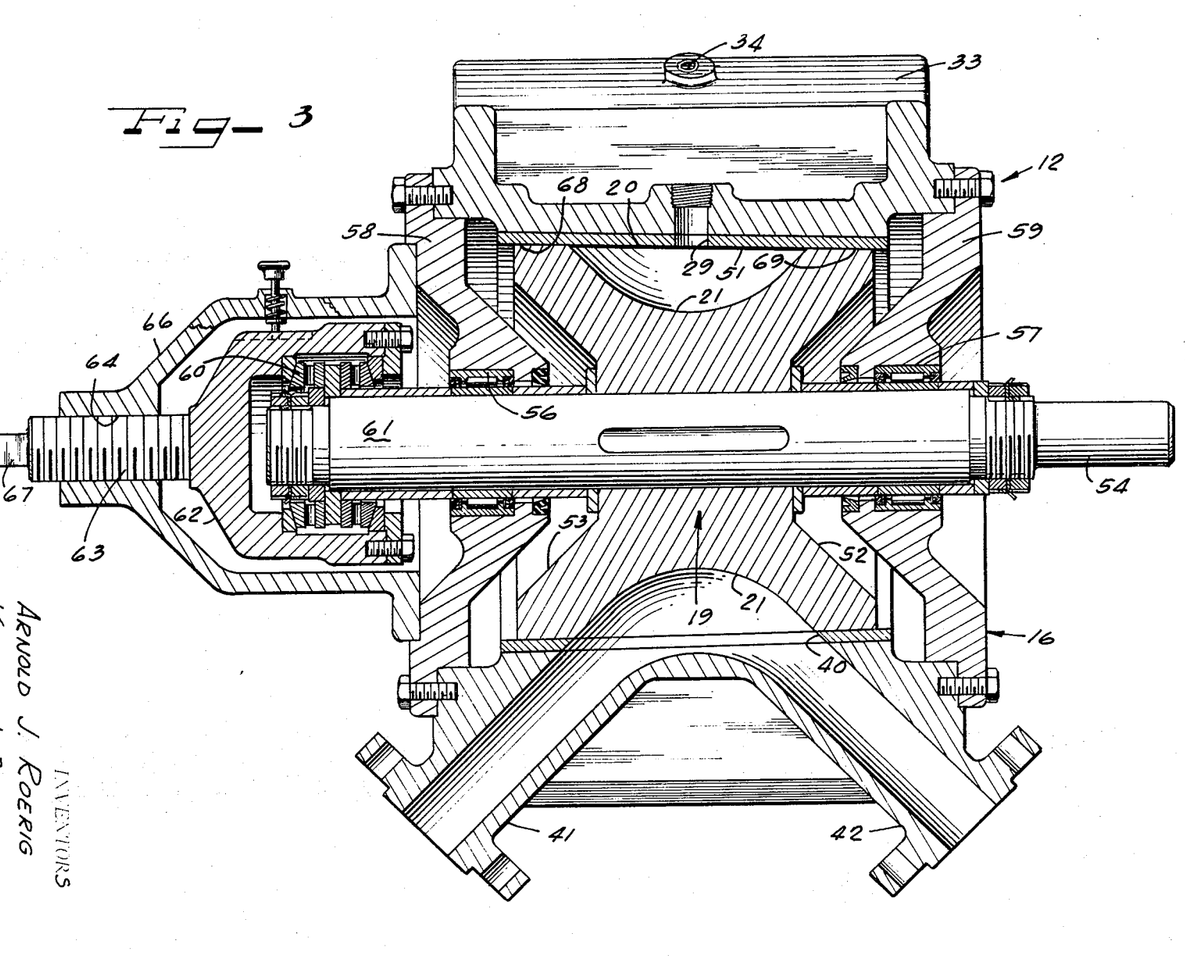
FIG. 3 is a sectional view taken along lines III—III of FIG. 2.

Referring to FIGS. 2 and 3, which illustrate sectional views of the chip feeder valve 12 shown in FIG. 1, it is noted that the chip bin 24 comprises a front wall 47 which terminates at its lowermost and at a leading edge 48 of the opening 23, and a back wall 49 which terminates at its lowermost end at a trailing edge 50 of the opening 23. A level of chips is maintained in the chip bin 24 and as the pockets 21 rotate across the opening 23 the chips are gravitationally delivered to the pockets. In order to minimize tearing or jamming of chips between the peripheral wall 20 of the rotor 19 and an inner wall 51 of the valve housing 16, the back wall 49 of the chip bin 24 is disposed at an angle from the horizontal which is greater than the angle between a horizontal line and a line intersecting the axis of rotation of the rotor 19 and the trailing edge 50 of the opening 23. As a result of this angular disposition of the back wall 49, chips which protrude upwardly out of the pockets 21 as they rotate past the opening 23 are urged upwardly and backwardly out of the pockets. This is particularly true with respect to chips protruding from the pockets near the rearward or trailing walls of the pockets.

As best seen in FIG. 3 the pockets 21 formed in the rotor 19 are axially elongated, generally half-moon shaped and are formed between a pair of end walls 52 and 53 of the rotor 19, which end walls are substantially frusto-conically shaped to taper or converge inwardly toward the rotor. A shaft 54 rotatably mounts the rotor 19 and is, in turn, journalled in a pair of bearing members 56 and 57 mounted, respectively, on end caps 58 and 59 of the housing 16 which are shaped complementarily to the end walls 52 and 53 of the rotor 19. As a result the axial spacing between the bearings 56 and 57 is reduced with a concomitant reduction in the lateral deflection of the shaft 54 and the rotor 19 as a result of radial forces acting on the rotor.

In operation the chip feeder valve 12 is disposed so that the shaft 54 extends horizontally and an axial thrust bearing 60 is situated at one end 61 of the shaft. One portion of the bearing 60 is corotatably fixed to end 61 of the shaft 54 and the other bearing portion is secured to a hollow collar 62 on the outer end of which is formed a threaded stud 63 which is received in a complementarily threaded bore 64 formed in a bell-shaped end housing 66 of the valve housing 16. An outer end 67 of the stud 63 is squared off to receive a tool such as a wrench to facilitate rotatable adjustment of the stud 63 and, correspondingly, axial adjustment of the shaft 54.

The peripheral wall 20 of the rotor 19 tapers slightly from one end 68 thereof to an opposite end 69, and the inner wall 51 of the valve housing 17 is shaped complementarily. As a result of this slight conical taper the spacing between the peripheral wall 20 of the rotor 19 and the inner wall 51 of the valve housing 17 can be adjusted by merely rotating the stud 63 to axially adjust the shaft 54. It will be understood that rotation of the shaft 54 can be effected by any suitable means such as, for example, an electric motor or the like.

Figure 4:
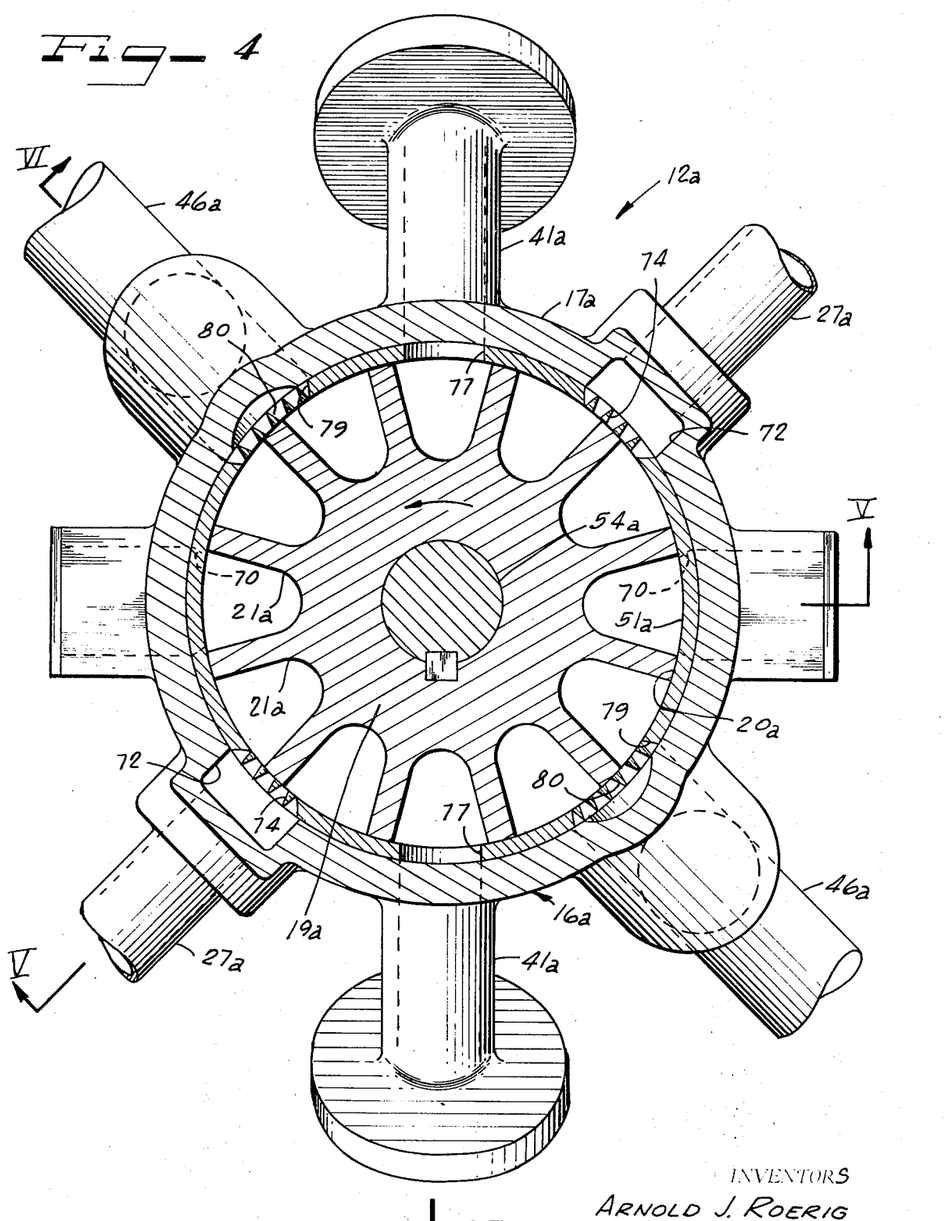
FIG. 4 is a horizontal sectional view of another embodiment of a chip feeder valve constructed in accordance with the principles of this invention.
Figure 5:
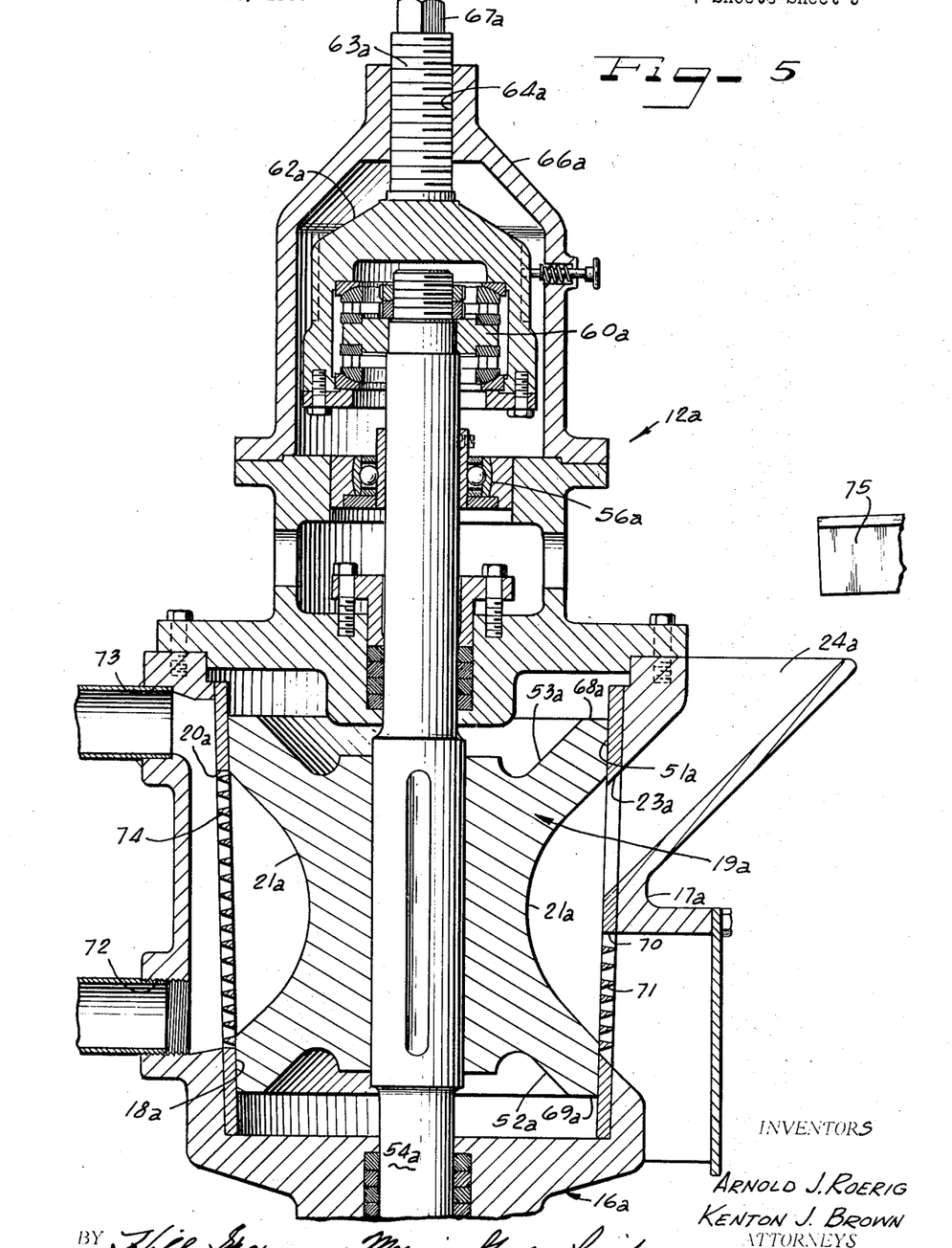
FIG. 5 is a vertical sectional view of the valve shown in FIG. 4 and is taken along lines V—V of FIG. 4.
Figure 6:
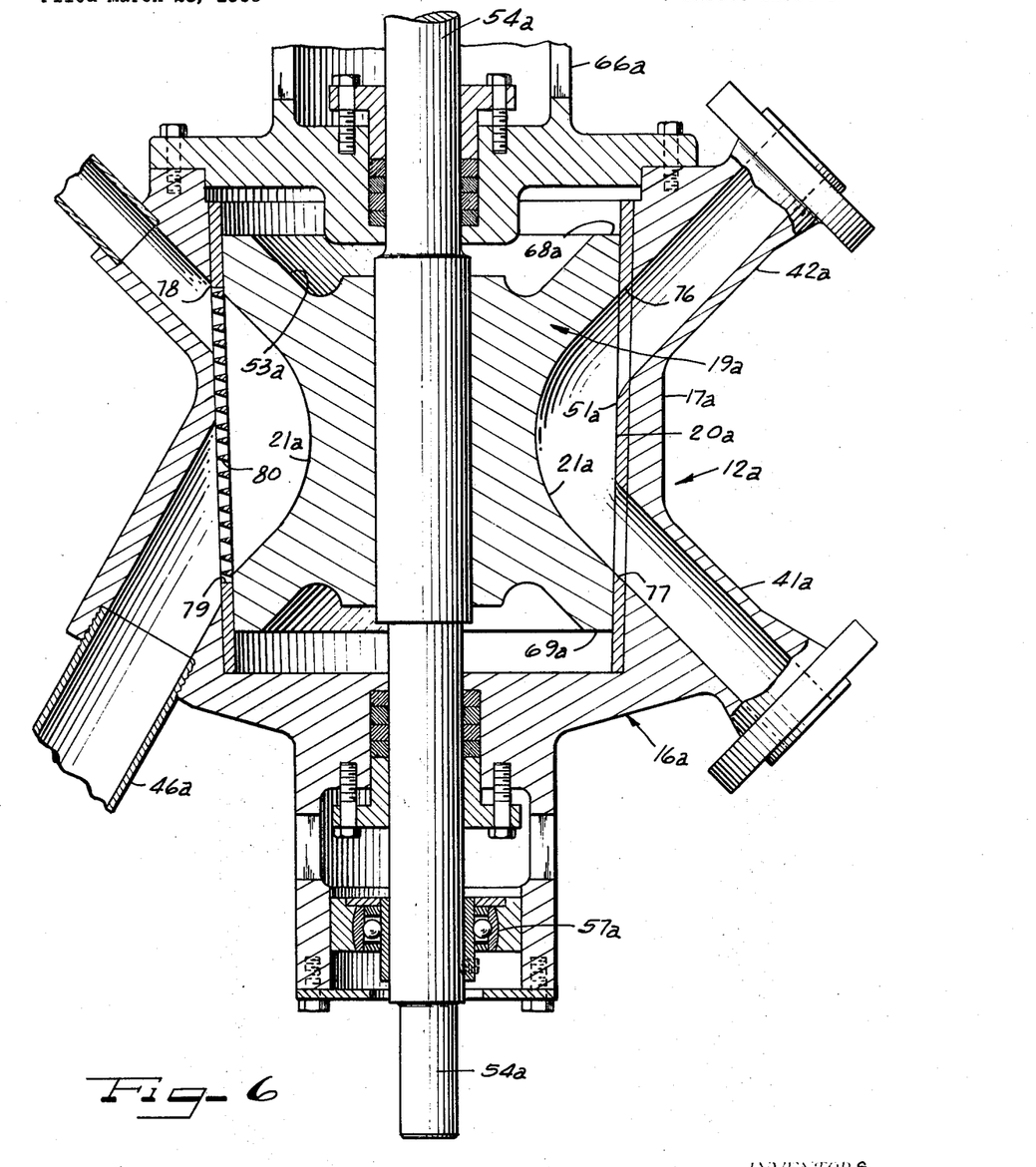
FIG. 6 is another vertical cross-sectional view of the valve shown in FIG. 4 taken along lines VI—VI of FIG. 4.

In FIGS. 4-6 is shown another embodiment of a chip feeder valve constructed in accordance with the principles of this invention. Parts similar to those shown in the embodiment of FIGS. 1-3 are given similar reference numerals with the suffix a added.

In this embodiment the axis of rotation of the rotor 19a extends vertically in contrast to the horizontal disposition of the axis of the rotation of the rotor 19 in the embodiment of FIGS. 1-3.

In order to deliver the chips into the pockets 21a the chip bin 24a slopes downwardly toward the opening 23a formed in the valve housing 17a. Another opening 70 is formed in the housing wall 17a directly below opening 23a and is fitted with a screen 71 extending thereacross whereby the fines of the chips pass through the screen 71 gravitationally to be deposited into a suitable receptacle. Suitable conveyor means or the like as indicated diagrammatically at 75 may be employed to continuously deliver a supply of chips to the chip bin 24a.

Spaced circumferentially from opening 23a in the direction of rotation of the rotor 19a are another pair of axially aligned openings 72 and 73 formed in the housing 17a for treating the chips to a relatively low pressure liquor as the pockets 21a carrying the chips rotate across openings 72 and 73. The low pressure liquor is introduced into the pockets 21a through opening 72, the companion opening 73 serving as an overflow for delivering excessive low pressure liquor back to the reservoir 13. A screen 74 is mounted on the housing wall 17a in order to retain the chips within the pockets 21a.

In this embodiment the pockets 21a next rotate across a pair of axially aligned openings 76 and 77 which are connected, respectively, to conduits 41 and 42 (FIG. 1) for flushing the chips out of the pockets and into the digester 11. Next the pockets rotate to a pair of axially aligned openings 78 and 79 for draining residual liquor from the pockets 21a, opening 79 being connected to conduit 46 (FIG. 1) and opening 78 communicating with atmosphere to provide a vent in order to ensure substantial drainage of the liquor from the pockets. A screen 80 is mounted on the valve housing wall 17a across opening 79 as a precautionary measure in order to prevent chips which may remain in the pockets from draining back to the liquor reservoir 13. It will be noted that in this embodiment also the peripheral wall 20a of the rotor 19a and, correspondingly, the inner surface 51a of the housing 17a, are tapered slightly from end 68a to end 69a of the rotor and of course to adjust for wear the rotor can be moved vertically or axially with respect to the valve housing through a threaded adjustment of the stud 63a at the top of the valve 12a.

It will also be noted in the embodiment shown in FIGS. 4-6 that the capacity of the valve 12a is doubled as a result of the duplication of the various treatment or operating stations. Thus, another and identical chip bin 24a is situated diametrically opposite the aforementioned bin 24a for supplying another quantity of chips into the pockets 21a as the pocketes rotate from the liquor drain openings 78 and 79. Likewise identical low pressure liquor stations, chip flushing stations and liquor drain stations are also spaced circumferentially around the housing in diametrically opposite relation to the heretofore described openings or stations. In fact, by enlarging the diameter of the chip feeding valve 12a, the only practical limit to the number of groups of stations which can be formed on the valve housing 16a is dictated by a practicable limitation on the physical size of the valve.

Figure 7:
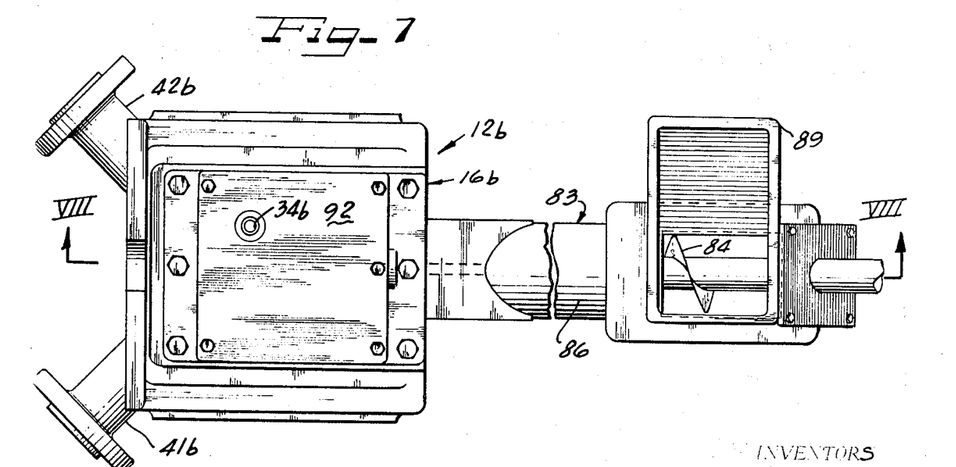
FIG. 7 is a top plan view of another embodiment of the chip feeder valve of this invention.
Figure 8:
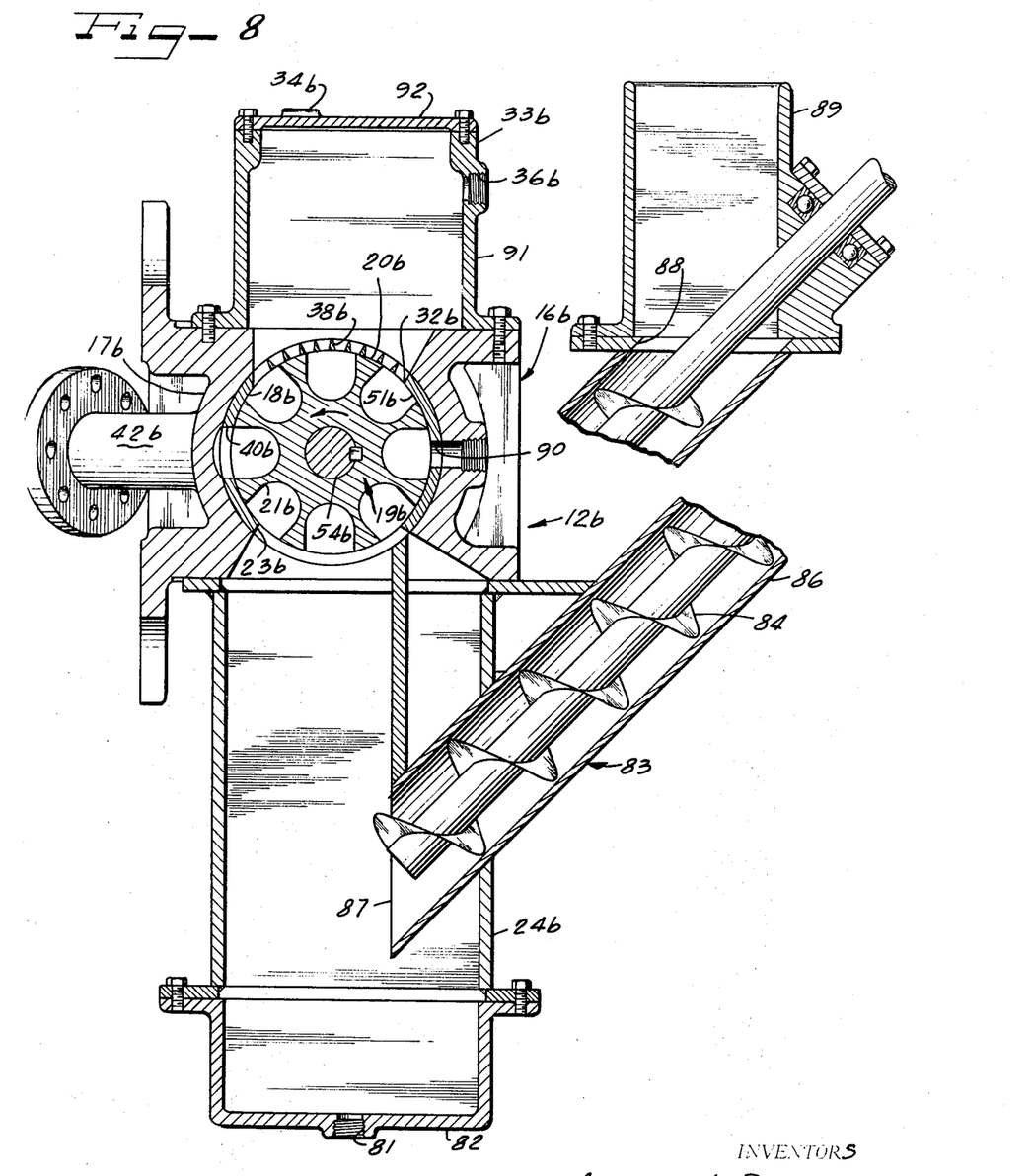
FIG. 8 is a vertical cross-sectional view taken along lines VIII—VIII of FIG. 7.

Referring to FIGS. 7 and 8, wherein parts similar to those illustrated in the previous figures are given similar reference numerals with the suffix b added, the axis of rotation of the rotor 19b is again horizontal in a manner similar to that of the embodiment shown in FIGS. 1-3. In this embodiment, however, the chip supply opening 23b formed in the valve housing wall 17b is situated at the bottom of the housing and the chip bin 24b depends downwardly from opening 23b and is of the enclosed type. In this embodiment the chips are not delivered into the pockets 21b in a dry state, but instead are mixed with liquor in the bin 24b before delivery into the pockets.

As illustrated, an inlet 81 is formed in a bottom wall 82 or the chip bin 24b for connection to a source of low pressure liquor for maintaining the bin in a completely filled condition.

A screw or worm gear arrangement indicated generally at reference numeral 83 is utilized to deliver chips into the bin 24b, and comprises a gear 84 rotatably carried within a tubular housing 86, a lower end 87 of which housing opens into the interior of the bin 24b, and an upper end 88 of which opens to a chip receptacle or depository 89. The chips are deposited, preferably in a continuous flow, into the receptacle 89 and are thence driven into the bin 24b by means of the gear 84, whereupon the chips float upwardly through the liquor in the bin 24b to fill the pockets 21b as the pockets are rotated across the chip opening 23b. The level of liquor in the bin 24b is necessarily maintained high enough to completely fill the pockets 21b as the pockets communicate with the bin, and accordingly the level of liquor in the tubular housing 86 is also necessarily maintained at a level above the level of the pockets 21b as they rotate across the chip opening 23b. It will be appreciated that this "submerged feed" arrangement wherein the chips are first submerged in liquor and allowed to float up into the rotor pockets from the bottom side provides a condition of chip selection.

As the pockets 21b rotate in a counterclockwise direction from the opening 23b they move across another opening 90 which is adapted for connection to a high pressure liquor conduit as, for example, conduit 30 shown in FIG. 1, for providing another treatment to the chips. The chips are then deaerated as the pockets rotate across the vent opening 32b which is surrounded by the vent enclosure 33b. The chips are prevented from floating upwardly out of the pockets 21b by means of the screen 38b mounted across the opening 32b. The enclosure 33b is vented to atmosphere through the opening 34b formed in a top wall 92 of the vent enclosure 33b, and a level of liquor is maintained within the enclosure 33b by means of the raised position of the drain opening 36b which is formed in a side wall 91 of the enclosure 33b and which is adapted for connection to a conduit drain such as indicated at reference numeral 37 in FIG. 1 for communication to the liquor reservoir 13.

After the chips have been deaerated the pockets 21b rotate counterclockwise to the next treatment or operating station which comprises a flushing opening 40b formed in the valve housing wall 17b and a pair of conduits 41b and 42b in communication with the opening 40b to flush the chips from the pockets of the rotor with high pressure liquor and to transfer the liquor and chips to the digester 11.

It will be noted that rotor 19 in FIGS. 1-3 and rotor 19a in FIGS. 4-6 have a total of 12 pockets formed therein, whereas the rotor 19b shown in FIGS. 7 and 8 has only 8 pockets formed therein. FIG. 9 illustrates an eight-pocket rotor as shown in FIG. 7 and 8, and it will be appreciated that this rotor can also be utilized in the other two embodiments of the chip feeder valve 12 and 12a. The number of pockets can be varied in accordance with capacity requirements, ease in machining, and other practical considerations.

Although minor modifications might be suggested by those versed in the art, it should be understood that we wish to embody within the scope of the patent warranted thereon all such modifications as reasonably come within the scope of our contribution to the art.

We claim as our invention:

1. A chip feeder valve for a continuous digester system comprising:
    a valve housing having a vertical substantially cylindrical bore formed therein,
    a vertical rotor carried in said bore,
    means for rotating said rotor in one direction of rotation in said bore,
    means forming a plurality of circumferentially spaced vertically extending pockets in said rotor opening to the periphery thereof,
    means forming a chip supply opening at one point in said housing in communication with said bore,
    means forming a chip bin on said housing around said chip supply opening for delivering chips into said pockets as the pockets are rotated across said chip supply opening,
    means forming a fine removal opening in said housing in communication with said bore and in axial alignment with said chip supply opening for enabling fines to fall from the pockets,
    a screen formed in said housing across said fine removal opening for separating the useable chips from the fines,
    means forming a low pressure liquor supply opening in said housing spaced circumferentially from said chip supply opening in the direction of rotation of said rotor and communicating with said bore for delivering low pressure liquor to the pockets carrying chips therein, and
    means forming a pair of axially aligned flushing openings in said housing spaced circumferentially from said low pressure liquor supply opening in the direction of rotation of said rotor and communicating respectively, with said bore, said means forming said flushing openings being circumferentially offset from a position opposite said means forming said chip supply opening,
    one of said flushing openings adapted for connection to a source of high pressure liquor for flushing the chips from said pockets and the other of said flushing openings adapted for connection to a digester for delivering the chips and the high pressure liquor to a digester.

2. A chip feeder valve for a continuous digester system comprising,
    a valve housing having a vertical substantially cylindrical bore formed therein,
    a vertical rotor carried in said bore,
    means for rotating said rotor in one direction of rotation in said bore,
    means forming a plurality of circumferentially spaced vertically extending pockets in said rotor opening to the periphery thereof,
    means forming a pair of chip supply openings at opposite points in said housing in communication with said bore,
    means forming a chip bin on said housing around each of said chip supply openings for delivering chips into said pockets as the pockets are rotated across said chip supply openings,
    means forming a pair of low pressure liquor supply openings at opposite points in said housing spaced circumferentially from said pair of chip supply openings in the direction of rotation of said rotor and communicating with said bore for delivering low pressure liquor to the pockets carrying chips therein, and
    means forming two pairs of axially aligned flushing openings at opposite points in said housing spaced circumferentially from said low pressure liquor supply openings in the direction of rotation of said rotor and communicating, respectively, with said bore, said means forming said flushing openings being circumferentially offset from a position opposite said means forming said chip supply opening,
    one of said flushing openings of each pair being adapted for connection to a source of high pressure liquor for flushing the chips from said pockets and the other of said flushing openings of each pair adapted for connection to a digester for delivering the chips and the high pressure liquor to a digester.

References Cited

UNITED STATES PATENTS

| 1,875,677 | 9/1932 | Thaler | 302—49 |
| 2,680,683 | 6/1954 | Obenshain | 302—49 |
| 2,858,212 | 10/1958 | Durant et al. | 302—49 |
| 2,933,208 | 4/1960 | Green | 302—49 |
| 2,960,245 | 11/1960 | Knapp | 302—49 |

ANDRES H. NIELSEN, Primary Examiner

U.S. Cl. X.R.

302—49